United States Patent
Hayabuchi et al.

(10) Patent No.: US 6,755,767 B2
(45) Date of Patent: Jun. 29, 2004

(54) SPEED-CHANGE CONTROL APPARATUS FOR AUTOMATIC TRANSMISSION

(75) Inventors: Masahiro Hayabuchi, Anjo (JP); Masaaki Nishida, Anjo (JP); Hiroshi Tsutsui, Anjo (JP); Kouichi Kojima, Anjo (JP); Yutaka Teraoka, Anjo (JP); Nobuhiro Iwai, Anjo (JP); Kiyoshi Akutsu, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/119,693

(22) Filed: Apr. 11, 2002

(65) Prior Publication Data

US 2002/0151409 A1 Oct. 17, 2002

(30) Foreign Application Priority Data

Apr. 13, 2001 (JP) ........................................ 2001-116175

(51) Int. Cl.[7] ............................................. F16H 61/26
(52) U.S. Cl. ........................ 477/158; 477/69; 477/120
(58) Field of Search ........................... 477/120, 68, 69, 477/70, 71, 121, 158; 475/269

(56) References Cited

U.S. PATENT DOCUMENTS

| 5,443,427 A | * | 8/1995 | Ataka et al. ................ 475/123 |
| 5,674,151 A | * | 10/1997 | de Schepper et al. ........ 477/120 |
| 5,697,864 A | * | 12/1997 | Watanabe ..................... 477/98 |
| 5,924,958 A | * | 7/1999 | Tsuchiya et al. ............ 477/145 |
| 5,941,795 A | * | 8/1999 | Tsuchiya et al. ............ 477/148 |

FOREIGN PATENT DOCUMENTS

| JP | 4-219553 | 8/1992 |
| JP | A 5-315898 | 11/1993 |
| JP | A 6-270444 | 9/1994 |

* cited by examiner

Primary Examiner—Tisha D. Lewis
(74) Attorney, Agent, or Firm—Oliff & Berridge, PLC

(57) ABSTRACT

The invention has been made to eliminate a feeling of two-phase speed-change operations by causing a speed-change operation to proceed continuously when the speed-change operation is performed through two-phase control of engagement and release of four engagement elements. To accomplish this purpose, the invention provides a control apparatus for an automatic transmission wherein a predetermined speed-change operation is achieved through a pre-phase speed-change operation in which a first engagement element and a third engagement element are released and engaged respectively and through a post-phase speed-change operation in which a second engagement element and a fourth engagement element are released and engaged respectively. The control apparatus sets a target rotational acceleration of an input shaft of the transmission, and controls release of the second engagement element for a transition to the post-phase speed-change operation in accordance with the target rotational acceleration. Thus, the input speed during the transition from the pre-phase speed-change operation to the post-phase speed-change operation changes continuously, so that bluntness is prevented from being caused between the pre-stage and post-stage speed-change operations.

19 Claims, 10 Drawing Sheets

|   | C-1 | C-2 | C-3 | B-1 | B-2 | B-3 | F-1 | F-2 |
|---|---|---|---|---|---|---|---|---|
| P |   |   |   |   |   |   |   |   |
| R |   |   | ○ |   |   | ○ |   |   |
| N |   |   |   |   |   |   |   |   |
| 1st | ○ |   |   |   |   | △ |   | ○ |
| 2nd | ○ |   |   | △ | ○ |   | ○ |   |
| 3rd | ○ |   | ○ |   | ● |   |   |   |
| 4th | ○ | ○ |   |   | ● |   |   |   |
| 5th |   | ○ | ○ |   | ● |   |   |   |
| 6th |   | ○ |   | ○ | ● |   |   |   |

# SPEED-CHANGE CONTROL APPARATUS FOR AUTOMATIC TRANSMISSION

INCORPORATION BY REFERENCE

The disclosure of Japanese Patent Application No. 2001-116175 is incorporated herein by reference in its entirety.

BACKGROUND OF THE INVENTION

1. Field of Invention

The invention relates to a control apparatus for an automatic transmission, and more particularly to an art for smoothly performing a speed-change operation requiring the release of two engagement elements and engagement of two engagement elements (simultaneous changeover of the four elements) between speed-change stages.

2. Description of Related Art

An automatic transmission is designed to change over power-transmission paths extending through speed-change elements composed of planetary gears by engaging or releasing frictional engagement elements and to establish a plurality of speed-change stages by changing a gear ratio. For the purpose of performing engagement and release of the engagement elements during a speed-change operation through the simplest hydraulic-pressure control while inhibiting generation of a speed-change shock, operations of the engagement elements for upshift or downshift are generally performed as follows. That is, basically, for a plurality of engagement elements or a single engagement element which are or is engaged to establish a certain speed-change stage, another one of the engagement elements is engaged additionally, or one engagement element that is in engagement is released. A so-called changeover operation of the engagement elements is performed if it is inevitable for reasons of the construction of a gear train. That is, while the engagement elements that are in engagement are released, the other engagement elements are engaged.

In recent years, automatic transmissions have developed a tendency of adopting a multiple-stage construction in response to a demand for an improvement in driveability and energy conservation based on reducing the amount of fuel consumption. Such a tendency of adopting a multiple-stage construction in automatic transmissions is realized in general by adding a speed-increasing or speed-reducing stage based on an overdrive or underdrive gear to a speed-change mechanism composed of a multiple-stage planetary gear set. As an alternative, however, there is also an art disclosed in Japanese Patent Application No. 4-219553. According to this art, a multiple-stage construction is achieved by two systems, namely, high and low systems for inputting power to a planetary gear set of a Ravigneaux type.

In the aforementioned gear train having a multiple-stage construction, the possibilities of selecting speed-change stages suited for a running condition of the vehicle are widened. Therefore, the changeover operation of engagement elements is not limited to a simple changeover of two elements but may be a complicated changeover of four elements if necessary. A so-called skip speed-change operation for shifting to a specific one of a multitude of speed-change stages at a stretch is an example requiring such changeover of four elements. In any case, in the case where such multiple changeover of four engagement elements is carried out, it is a serious problem as to how to control the sequence in which the engagement elements are engaged or released and timings at which the engagement elements are engaged or released. If this control is performed in a certain manner, a speed-change operation performed in the speed-change mechanism does not proceed smoothly or continuously. As a result, problems such as the occurrence of a phasic shock during the speed-change operation, an extraordinarily great shock at the end of the speed-change operation, and an unnecessarily prolonged speed-change period are caused.

SUMMARY OF THE INVENTION

The invention thus provides a speed-change control apparatus for an automatic transmission capable of preventing an increase in an interval between speed-change operations while preventing the occurrence of a shock during a speed-change operation requiring engagement and release of four engagement elements, by ensuring the smooth proceeding of the speed-change operation.

In various embodiments of the control apparatus for an automatic transmission where an operation of four engagement elements is acquired at the time of a speed-change operation for a first speed-change stage to the second speed-change stage, wherein the first speed-change stage is established through engagement of a first engagement element and a second engagement element and wherein a second speed-change stage is established through engagement of a third engagement element and a fourth engagement element, the control apparatus includes a speed-change control device for controlling a state of the second engagement element prior to the start of release of the second engagement element in accordance with a predetermined target rotational acceleration.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
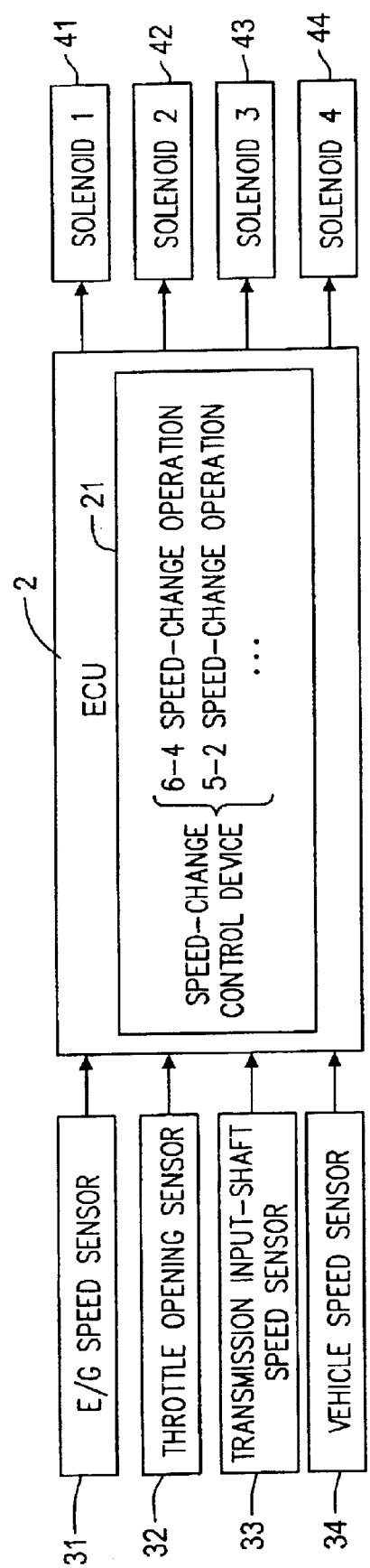
FIG. 1 is a block diagram showing a construction of a signal system of a control apparatus for an automatic transmission according to an embodiment of the invention.

An embodiment of the invention will now be described with reference to the drawings. FIG. 1 is a block diagram of a configuration of a signal system of a control apparatus. As shown in FIG. 1, this control apparatus has an electronic control unit (ECU) 2, which is a central component member of the control apparatus. The control apparatus has various sensors as an input means for inputting various pieces of information to the ECU 2, namely, an engine (E/G) speed sensor 31 for detecting an engine speed of a vehicle, a throttle opening sensor 32 for detecting an engine load, a transmission input-shaft speed sensor 33 for detecting an input speed of a transmission, and a vehicle speed sensor 34 for detecting a vehicle speed from a speed of an output shaft of the transmission. The control apparatus has a plurality of solenoids as an output means operating by the output of a drive signal based on control information, namely, solenoids 1 to 4 as actuators for solenoid valves 41 to 44 disposed in a hydraulic control unit, which will be described later in detail with reference to FIG. 5.

Figure 2:
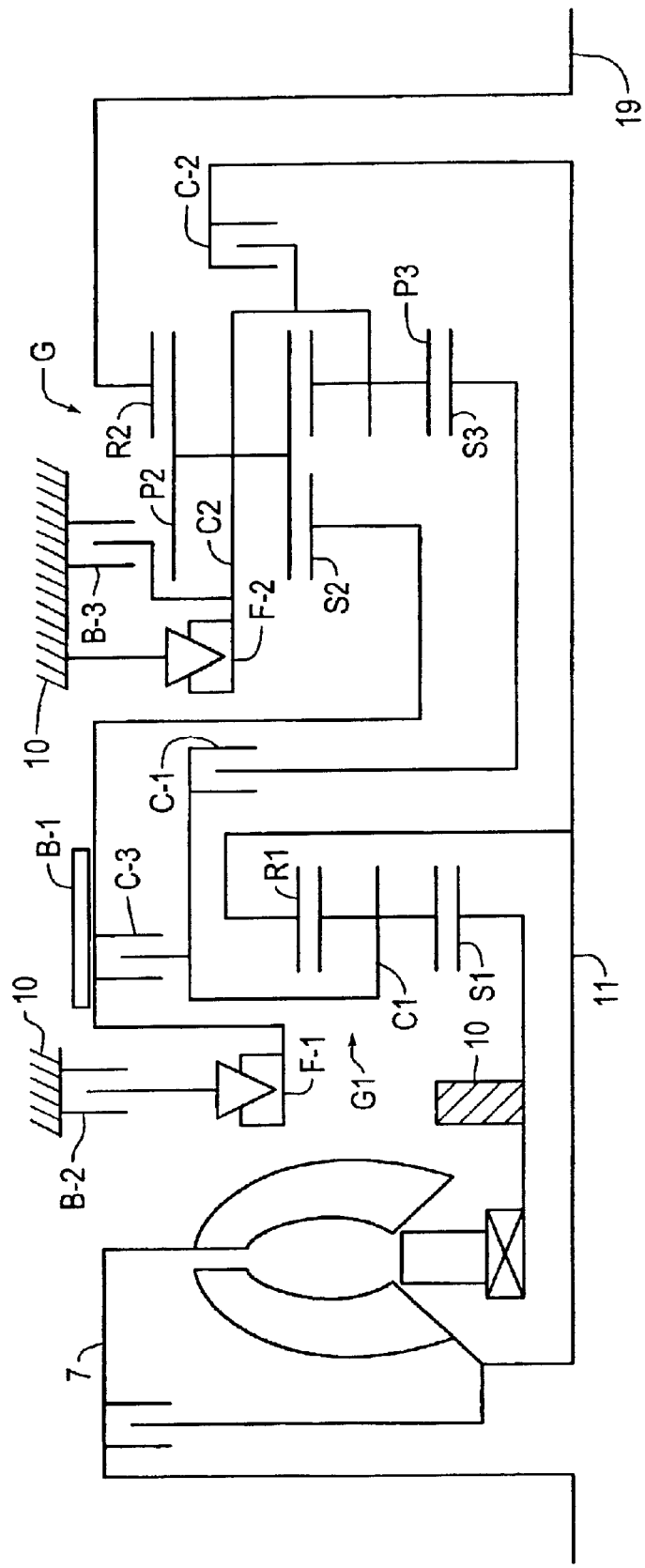
FIG. 2 is a skeleton diagram of a gear train of the automatic transmission.

FIG. 2 is a skeleton diagram showing a six-speed gear train for FR vehicles as an example of a speed-change mechanism controlled by the aforementioned control apparatus. This gear train is composed of a torque converter 7 and a speed-change mechanism. The torque converter 7 is equipped with a lock-up clutch. The speed-change mechanism has six forward stages and one backward stage and is composed of a planetary gear set G of a Ravigneaux type and a deceleration gear GI of a simple planetary type.

The planetary gear set G, which is a main component member of the speed-change mechanism, is constructed of a gear set of a Ravigneaux type. The gear set is composed of sun gears S2, S3 having different diameters, a ring gear R2, a long pinion gear P2 that meshes with the large-diameter sun gear S2 in a circumscribed manner and that meshes with the ring gear R2 in an inscribed manner, a short pinion gear P3 that meshes with the small-diameter sun gear S3 in a circumscribed manner and that also meshes with the long pinion gear P2 in a circumscribed manner, and a carrier C2 supporting both the pinion gears P2, P3. The small-diameter sun gear S3 of the planetary gear set G is coupled to a multiple-disc clutch (C-1) (Hereinafter, each engagement element is marked with a symbol, which precedes the name of the element.). The large-diameter sun gear S2 is coupled to a multi-disc C-3 clutch and can be hooked to an automatic transmission case 10 by a B-1 brake constructed of a band brake. Furthermore, the large-diameter sun gear S2 can be hooked to the automatic transmission case 10 by a multiple-disc B-2 brake and an F-1 one-way clutch, which are disposed in parallel with the B-1 brake. The carrier C2 is coupled to an input shaft 11 via a C-2 clutch as a multiple-disc engagement element, and can be hooked to the transmission case 10 by a multiple-disc B-3 brake. Also, the carrier C2 can be hooked to the transmission case 10 by an F-2 one-way clutch in such a manner as to rotate in one direction. The ring gear R2 is coupled to an output shaft 19.

The deceleration planetary gear GI is constructed of a simple planetary gear. A ring gear R1 as an input element of the deceleration planetary gear G1 is coupled to the input shaft 11. A carrier C1 as an output element of the deceleration planetary gear G1 is coupled to the small-diameter sun gear S3 via the C-1 clutch and to the large-diameter sun gear S2 via the C-3 clutch. A sun gear S1 as a stationary element for gaining a counterforce is fixed to the transmission case 10.

Figures 3, 4:
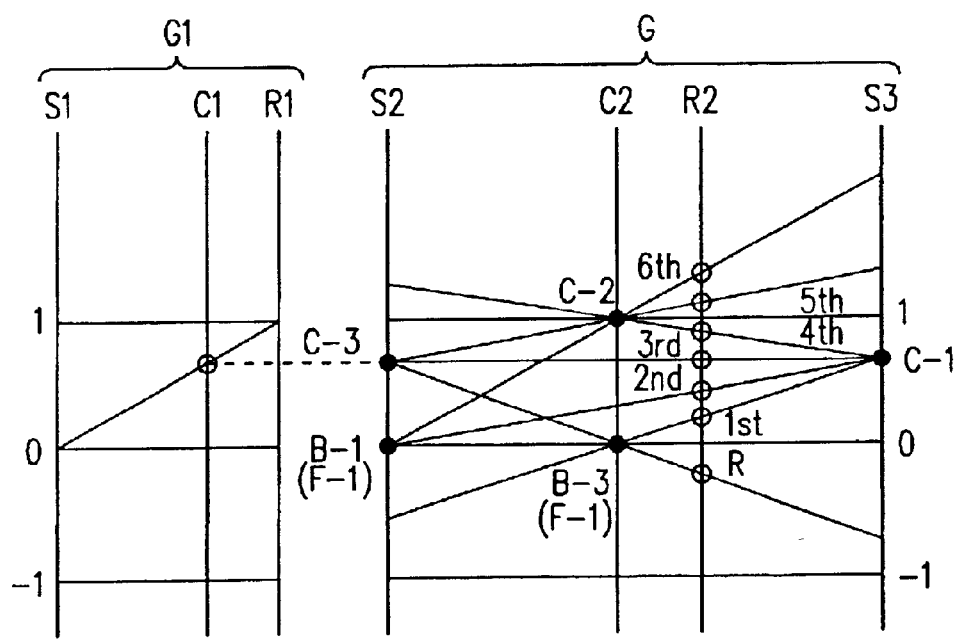
FIG. 3 is an engagement chart showing a relation between an engagement and release of engagement elements on one hand and speed-change stages achieved by the gear train on the other hand.
FIG. 4 is a speed diagram of the gear train.

FIG. 3 is an engagement chart showing how speed-change stages to be established are related to engagement and release of the engagement elements of this automatic transmission, that is, the clutches, the brakes, and the one-way clutches. In the engagement chart, each blank filled in with O, each unfilled blank, each blank filled in with Δ, and each blank filled in with • represent engagement, release, engagement for engine braking, and engagement that does not directly affect establishment of a speed-change stage, respectively. FIG. 4 is a speed diagram showing how speed-change stages established through engagement of each of the clutches, brakes, and one-way clutches (Engagement is denoted by •.) are related to speed ratios among the speed-change elements.

As is apparent from both FIGS. 3 and 4, a first-speed (1st) stage is established through engagement of the C-1 clutch and the B-3 brake (Automatic engagement of the F-2 one-way clutch is adopted instead of engagement of the B-3 brake as is apparent from an operational chart in this embodiment. Engagement of the F-2 one-way clutch is adopted as the equivalent of engagement of the B-3 brake because the F-1 one-way clutch for automatically releasing an engaging force upon engagement of the B-1 brake is used to avoid complication of hydraulic pressure control for changeover between the B-3 brake and the B-1 brake during a 1–2 speed-change operation that will be described later and to simplify release control of the B-3 brake.). In this case, rotation that has been transmitted from the input shaft 11 via the deceleration planetary gear GI while being decelerated is input to the small-diameter sun gear S3 via the C-1 clutch, gains a counterforce from the carrier C2 that has been hooked through engagement of the F-2 one-way clutch, and is output to the output shaft 19 as decelerated rotation of the ring gear R2 at a maximum deceleration ratio.

A second-speed (2nd) stage is then established through engagement of the F-1 one-way clutch and engagement of the B-2 brake, which makes engagement of the F-1 one-way clutch effective. Engagement of the F-1 one-way clutch and the B-2 brake is equivalent to engagement of the C-1 clutch and the B-1 brake (It will be described later in detail why engagement of the F-1 one-way clutch and the B-2 brake is equivalent to engagement of the C-1 clutch and the B-1 brake.). In this case, rotation that has been transmitted from the input shaft 11 via the deceleration planetary gear GI while being decelerated is input to the small-diameter sun gear S3 via the C-1 clutch, gains a counterforce from the large-diameter sun gear S2 that has been hooked through engagement of the B-2 brake and the F-1 one-way clutch, and is output to the output shaft 19 as decelerated rotation of the ring gear R2. As is apparent from FIG. 4, the deceleration ratio at this moment is smaller than the deceleration ratio in the case of the first-speed (1st) stage.

A third-speed (3rd) stage is established through simultaneous engagement of the C-1 clutch and the C-3 clutch. In this case, rotation that has been transmitted from the input shaft 11 via the deceleration planetary gear G1 while being decelerated is simultaneously input to the large-diameter sun gear S2 and the small-diameter sun gear S3 via the C-1 clutch and the C-3 clutch respectively, so that the planetary gear set G assumes a direct-coupled state. Therefore, rotation of the ring gear R, which is the same as rotation that has been input to both the sun gears, is output to the output shaft 19 as rotation that has been decelerated with respect to rotation of the input shaft 11.

Furthermore, a fourth-speed (4th) stage is established through simultaneous engagement of the C-1 clutch and the C-2 clutch. In this case, while rotation that has been transmitted from the input shaft 11 via the deceleration planetary gear G1 while being decelerated is input to the small-diameter sun gear S3 via the C-1 clutch, non-decelerated rotation that has been input from the input shaft 11 via the C-2 clutch is input to the carrier C2. Intermediate rotation between the two input rotations is output to the output shaft 19 as rotation of the ring gear R2, which has been slightly decelerated with respect to rotation of the input shaft 11.

A fifth-speed (5th) stage is then established through simultaneous engagement of the C-2 clutch and the C-3 clutch. In this case, while rotation that has been transmitted from the input shaft 11 via the deceleration planetary gear GI while being decelerated is input to the large-diameter sun gear S2 via the C-3 clutch, non-decelerated rotation that has been input from the input shaft 11 via the C-2 clutch is input to the carrier C2. Rotation of the ring gear R2, which has been slightly accelerated with respect to rotation of the input shaft 11, is output to the output shaft 19.

A sixth-speed (6th) stage is then established through engagement of the C-2 clutch and the B-1 brake. In this case, non-decelerated rotation is input only to the carrier C2 from the input shaft 11 via the C-2 clutch, gains a counterforce from the sun gear S2 that has been hooked through engagement of the B-1 brake, and is output to the output shaft 19 as further accelerated rotation of the ring gear R2.

A backward (R) stage is established through engagement of the C-3 clutch and the B-3 brake. In this case, rotation that has been transmitted from the input shaft 11 via the deceleration planetary gear GI while being decelerated is input to the large-diameter sun gear S2 via the C-3 clutch, gains a counterforce from the carrier C2 that has been hooked through engagement of the B-3 brake, and is output to the output shaft 19 as reverse rotation of the ring gear R2.

It will now be described, though alluded to in the foregoing description, how the F-1 one-way clutch is related to the B-1 brake and the B-2 brake. In this case, the F-1 one-way clutch, coupled to the sun gear S2, is engaged in such a direction as to support a counter torque of the large-diameter sun gear S2 at the second-speed stage, whereby the F-1 one-way clutch can substantially perform the same function as engagement of the B-1 brake. However, since the large-diameter sun gear S2 is different from the carrier C2 and is a speed-change element that not only is engaged to achieve the effect of engine braking at the second-speed stage but also is hooked to establish the sixth-speed stage, the B-1 brake is required. As is also apparent from the speed diagram shown in FIG. 4, the large-diameter sun gear S2 rotates reversely with respect to a direction of input rotation upon establishment of the first-speed (1st) stage, but rotates in the direction of input rotation at the third-speed stage or any higher speed stage. Accordingly, the F-1 one-way clutch cannot be directly coupled to a stationary member and thus is disposed in series with the B-2 brake so as to make it possible to control the effectiveness of an engaged state.

As is qualitatively apparent from vertical distances among the marks O indicating speed ratios of the ring gear R2 in the speed diagram shown in FIG. 4, each speed-change stage established as described above is relatively equidistant from its adjacent speed-change stages, so that good speed steps are obtained. This gear train does not require multiple changeover of the engagement elements during a normal upshift or downshift operation between two adjacent speed-change stages but requires it during a skip speed-change operation. Such a skip speed-change operation is necessary especially during a downshift operation such as a 6-3 or 5-2 speed-change operation (During this speed-change operation, the B-2 brake is always engaged at the second-speed stage or any higher speed stage for the sake of simplification of control. Therefore, automatic engagement of the F-1 one-way clutch plays the same role as engagement of the B-1 brake.).

Figure 5:
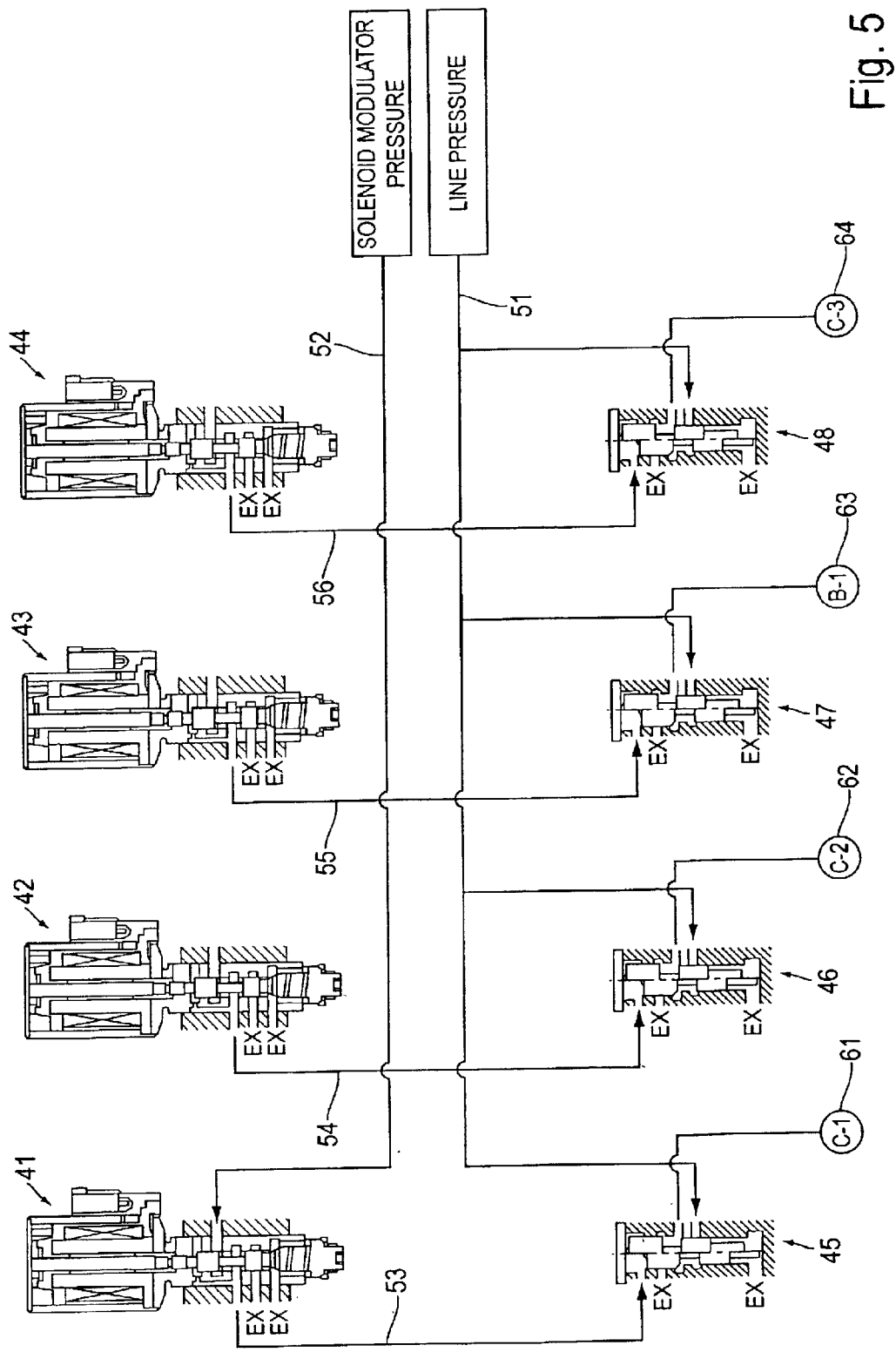
FIG. 5 is a hydraulic circuit diagram of an operational system of the control apparatus.

The hydraulic control unit for controlling the speed-change mechanism thus constructed by operating hydraulic servos for the aforementioned clutches and brakes is designed such that each of the hydraulic servos for a corresponding one of the engagement elements is controlled directly and independently by a proper solenoid valve on the basis of a solenoid drive signal from the electronic control unit 2 so as to make the aforementioned skip speed-change operation easy to perform. As is apparent from a concrete circuit construction shown in FIG. 5, this hydraulic circuit is constructed as follows. That is, control valves 45 to 48 are connected in parallel with one another with respect to a line-pressure hydraulic passage 51, which is connected to a circuit for supplying a line pressure (a maximum pressure allowing the engagement elements to be maintained in an engaged state in accordance with a running load of the vehicle). FIG. 5 indicates this circuit as a block instead of showing its concrete construction. Each of the control valves 45 to 48 operates for pressure regulation in accordance with a solenoid pressure applied from a corresponding one of solenoid valves 41 to 44.

To be more specific, a hydraulic servo 61 for the C-1 clutch is connected to the line-pressure hydraulic passage 51 via a C-1 control valve 45, which is connected at its spool end to a hydraulic passage 52 for a solenoid modulator pressure (a hydraulic pressure that is obtained by reducing a line pressure via a modulator valve so as to increase a gain of pressure regulation by a solenoid valve). The C-1 control valve 45 is designed as a spool valve having lands at its opposed ends, and the lands are different in diameter. The C-1 control valve 45 is constructed such that a solenoid signal pressure is applied to the large-diameter land end against a spring load applied to the small-diameter land end, that the large-diameter land thereby closes a drain port, that the line-pressure hydraulic passage 51 and the hydraulic servo 61 thereby communicate with each other while the small-diameter land narrows a gap between an inlet port leading to the line-pressure hydraulic passage 51 and an outlet port leading to the hydraulic servo 61, that the small-diameter land closes the inlet port and the large-diameter land opens the drain port as soon as a solenoid pressure is released, and that the hydraulic servo 61 is connected in a drainable manner as a result. On the other hand, the solenoid valve 41 is designed as a normal-open linear solenoid valve. Similarly, the solenoid valve 41 is constructed such that a gap between the solenoid-modulator-pressure hydraulic passage 52 and a solenoid-pressure hydraulic passage 53 is adjusted by a load applied to a plunger against a spring load applied to one end of a spool having lands at its opposed ends and that a solenoid pressure is regulated by adjusting an amount of drainage through the solenoid-pressure hydraulic passage 53. The C-2 clutch, the B-1 brake, and the C-3 clutch also adopt a parallel circuit construction that is quite similarly composed of the control valves 46, 47, 48, the solenoid valves 42, 43, 44, and solenoid-pressure hydraulic passages 54, 55, 56, respectively. The solenoid-pressure hydraulic passages 54, 55, 56 connect the control valves 46, 47, 48 to the solenoid valves 42, 43, 44, respectively.

The automatic transmission thus constructed requires operation of four engagement elements (the C-1 clutch, the C-2 clutch, the C-3 clutch, and the B-1 brake), for example, during a 6-3 speed-change operation wherein the first speed-change stage is the sixth-speed stage and wherein the second speed-change stage is the third-speed stage that is apart from the sixth-speed stage by three stages. In this case, the first speed-change stage (the sixth-speed stage) is established through engagement of the first and second engagement elements (the B-1 brake and the C-2 brake), and the second speed-change stage is established through engagement of the third and fourth engagement elements (the C-1 clutch and the C-3 clutch). In the case where the first speed-change stage is the fifth-speed stage, operation of four engagement elements (the C-1 clutch, the C-2 clutch, the C-3 clutch, and the F-1 one-way clutch) is also required during a speed-change operation from the fifth-speed stage to the second-speed stage that is apart from the fifth-speed stage by three stages. In this case, the first, second, third, and fourth engagement elements are the C-2 clutch, the C-3 clutch, the C-1 clutch, and the F-1 one-way clutch, respectively. Thus, according to the invention, in preparation for such a speed-change operation, the speed-change control unit is provided with the speed-change control means 21 (see FIG. 1) for starting to release of the second engagement element (the C-2 clutch or the C-3 clutch) after the start of release of the first engagement element (the B-1 brake or the C-1 clutch), completing engagement of the fourth engagement element (the C-3 clutch or the F-1 one-way clutch) after completion of engagement of the third engagement element (the C-1 clutch), and starting to release the second engagement element (the C-2 clutch or the C-3 clutch) prior to completion of engagement of the third engagement element (the C-1 clutch).

It is to be noted herein that engagement or release of the engagement elements includes a transient slip state leading to complete engagement or complete release. Accordingly, starting to release a certain engagement element means starting to cause it to slip. As regards an engagement element that is operated hydraulically, starting to release it means starting to cause it to slip through a decrease in engaging force. As regards a one-way clutch that is not operated hydraulically, starting to release it means making it free in accordance with a change in rotational direction of a rotational member. Similarly, completing engagement of a certain engagement element means causing it to stop slipping. Accordingly, as regards an engagement element that is operated hydraulically, completing its engagement means causing it to stop slipping through an increase in engaging force, and as regards a one-way clutch that is not operated hydraulically, completing its engagement means locking it in accordance with a change in rotational direction of a rotational member.

In this embodiment, the speed-change control device 21 is designed such that the first speed-change stage (the sixth-speed stage or the fifth-speed stage) is established through operation of two (the C-1 clutch and the B-1 brake) of the aforementioned four engagement elements, that the second speed-change stage (the third-speed stage or the second-speed stage) is established through operation of the other two engagement elements, that a third speed-change stage (the fourth-speed stage or the third-speed stage) is set, and that a speed-change operation from the first speed-change stage (the sixth-speed stage or the fifth-speed stage) to the second speed-change stage (the third-speed stage or the second-speed stage) is shifted to a speed-change operation from the third speed-change stage (the fourth-speed stage or the third-speed stage) to the second speed-change stage (the third-speed stage or the second-speed stage) via a speed-change operation from the first speed-change stage (the sixth-speed stage or the fifth-speed stage) to the third speed-change stage (the fourth-speed stage or the third-speed stage). In this case, the four engagement elements are the C-1 clutch that is engaged during a speed-change operation to the third speed-change stage (the fourth-speed stage or the third-speed stage), the B-1 brake or the C-2 clutch that is released during the speed-change operation, the C-3 clutch or the F-1 one-way clutch that is engaged during a speed-change operation to the second speed-change stage (the third-speed stage or the second-speed stage), and the C-2 clutch or the C-3 clutch that is released during the speed-change operation.

A concrete construction of the speed-change control device 21 will now be described while referring to the case of a 6-3 speed-change operation as an example. The speed-change control device 21 of this embodiment is constructed as a program in the control unit. The speed-change operation is performed by controlling the hydraulic servos 61 to 64 for the engagement elements through operation of the solenoid valve 42 caused by a solenoid drive signal, which is output on the basis of the program. Hereinafter, control flowcharts of the speed-change control device 21 for the engagement elements will be described one by one.

Figure 6:
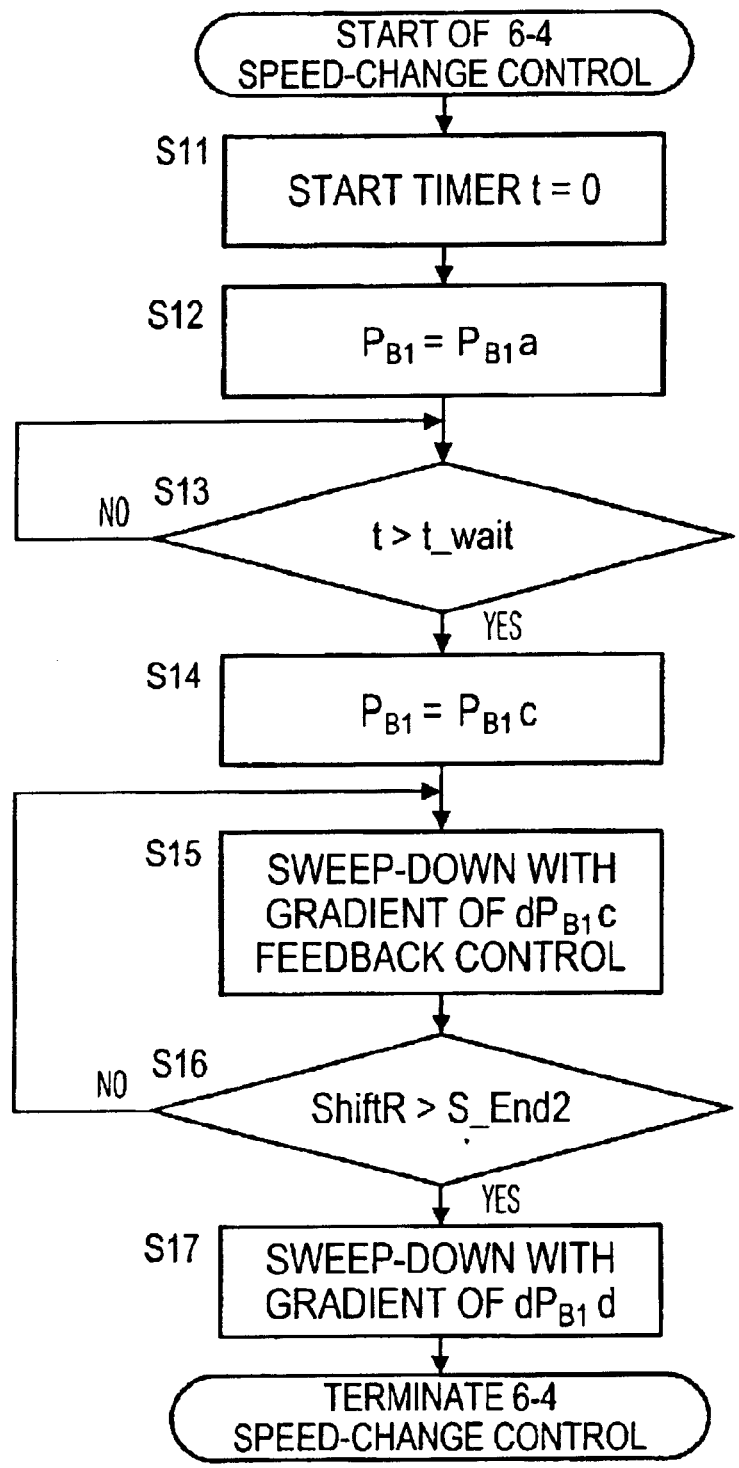
FIG. 6 is a flowchart of release control of a B-1 brake during a 6-3 speed-change operation.

First of all, a control flowchart for releasing the B-1 brake or the first engagement element is shown in FIG. 6.

B-1 Release Control

This control is started by starting a timer in step S11 (start timer t=0) on the basis of a speed-change command. A processing of temporarily maintaining the servo hydraulic pressure at a predetermined pressure slightly lower than an engaging pressure ($P_{B1}=P_{B1}a$) is then performed in step S12. This processing is intended to prevent the engine from undergoing prefiring due to operational dispersion in the C-1 clutch resulting from aging or a difference among individual transmissions. A period for maintaining this predetermined pressure is then monitored in step S13. The processing is continued until the result of the determination (timer t>t___ wait) in step S13 becomes positive. After the timer has measured the lapse of a certain period, a processing of starting to release the B-1 brake is performed in step S14 so as to reduce the servo hydraulic pressure to a predetermined pressure at a stretch ($P_{B1}=P_{B1}c$). A processing of gradually reducing the servo hydraulic pressure (sweep-down with a gradient of dPBlc, feedback control) is then performed in step S15. Furthermore, a determination on a proceeding degree (ShiftR) of the speed-change operation is then made in step S16. To be more specific, this hydraulic-pressure control processing is designed to control an electric current value of a drive signal transmitted to a solenoid 3 shown in FIG. 1 and operate the solenoid valve 43 shown in FIG. 5 for pressure regulation so that the solenoid pressure thus obtained reduces the hydraulic pressure of the hydraulic servo with the gradient of dPBlc through the control valve 47 (This relation between the drive signal and the servo pressure is maintained in all the hydraulic control operations that will be described below.). This proceeding degree (ShiftR) of the speed-change operation can also be determined using a speed of the input shaft or a hydraulic pressure of the hydraulic servo as an indicator of determination. In this embodiment, however, the proceeding degree of the speed-change operation is expressed by an equation shown below, using speeds of the input shaft and the output shaft as indicators.

ShiftR=(speed of input shaft of transmission−pre-speed-change gear ratio×speed of output shaft of transmission)×100/speed of output shaft of transmission×(post-speed-change gear ratio−pre-speed-change gear ratio)[%]

The proceeding degree (ShiftR) of the speed-change operation is calculated on the basis of values detected by the transmission input-shaft speed sensor 33 and the vehicle speed sensor 34 shown in FIG. 1. For instance, a comparative value (S_End2) used in this determination is set as 70%. Because the result of this determination is negative (No) at the outset, a loop for returning to step S15 is repeated. If the result of the determination on the proceeding degree of the speed-change operation in step S16 becomes positive (ShiftR>S_End2), a low-pressure processing of completely removing the servo hydraulic pressure of the B-1 brake (sweep-down with a gradient of $dP_{B1}d$) is then performed in step S17. This processing is completed automatically as soon as a solenoid valve 3 reaches a full output. Therefore, the 6-4 speed-change control for releasing the B-1 brake is terminated without performing any further monitoring or determining operation.

Figure 7:
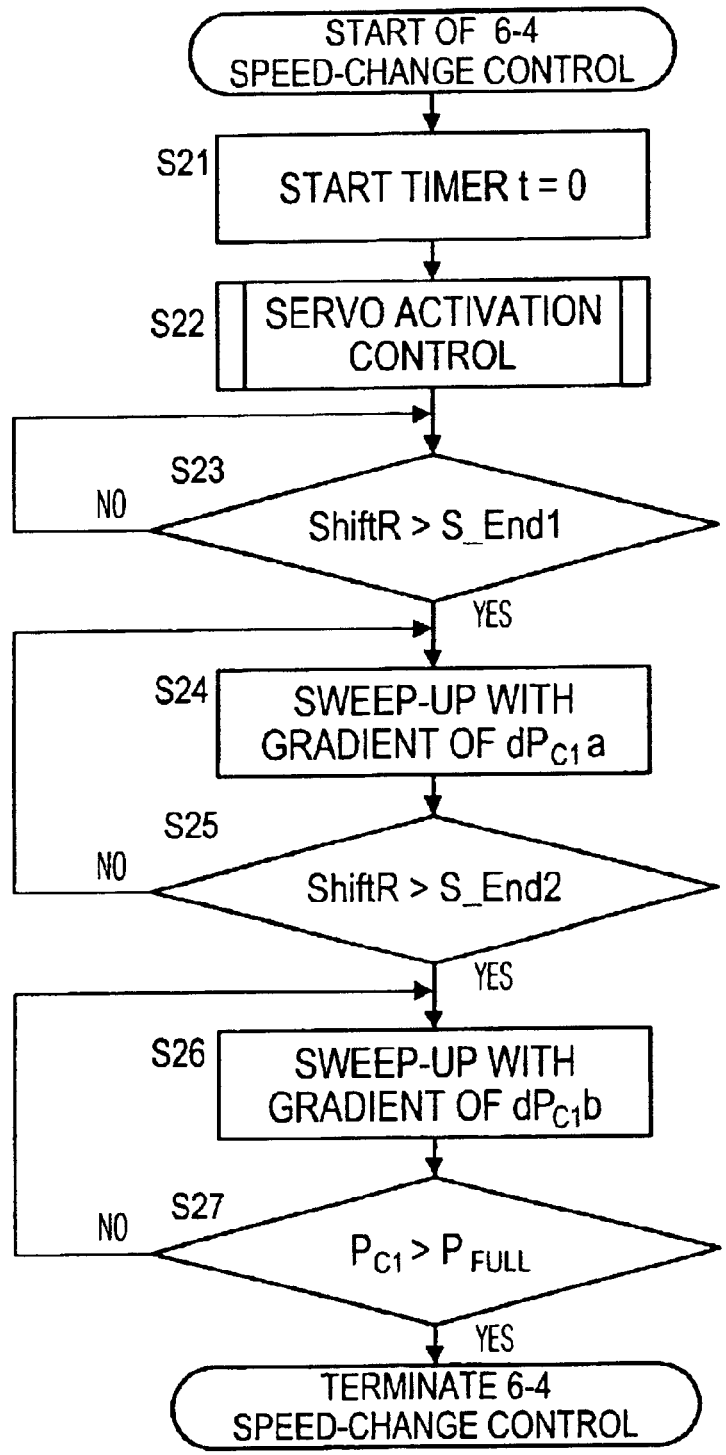
FIG. 7 is a flowchart of engagement control of a C-1 brake during the 6-3 speed-change operation.

A control flowchart for engaging the C-1 clutch or the third engagement element is shown in FIG. 7.

C-1 Engagement Control

In this control as well, the timer is first started in step S21 (start timer t=0). A servo activation control sub-routine processing is then performed in step S22. This processing is designed to maintain a fast fill of a hydraulic pressure for filling a hydraulic servo cylinder for the C-1 clutch and a subsequent piston stroke pressure for narrowing a gap between a hydraulic servo piston and a frictional member of the engagement element. This processing is a known processing that is usually performed to engage a clutch. A determination on a proceeding degree as an indicator (ShiftR) for making a determination on a proceeding degree of a speed-change operation is made (ShiftR>S_End1) in step S23. For instance, a comparative value (S_End) used in this case is set as 70%. Because the result of this determination is negative (No) at the outset, the processing for this determination is continued until the proceeding of the speed-change operation is completed. As soon as the result of the aforementioned determination becomes positive (Yes), a pressure-increasing operation for starting engagement of the C-1 clutch (sweep-up with a gradient of $dP_{c1}a$) is started in step S24. In step S25, while this pressure-increasing operation is continued, it is determined whether or not the proceeding degree (ShiftR) of the speed-change operation has reached a state prior to synchronization with the fourth-speed stage, for example, 90% (ShiftR>S_End2). Because the result of this determination is also negative (No) at the outset, the sweep-up operation is continued through repetition of a loop for returning to step S24 until the proceeding of the speed-change operation is completed. If the result of the determination in step S25 becomes positive, a processing of increasing the servo hydraulic pressure to a line pressure (sweep-up with a gradient of $dP_{C1}b$) is performed in step S26 so as to reliably maintain engagement of the C-1 clutch. A processing of determining whether the servo hydraulic pressure has reached the line pressure ($P_{C1}>P_{FULL}$) is then repeated in step S27. As soon as the result of the determination in step S27 becomes positive, the 6-4 speed-change control for engagement control of the C-1 clutch is terminated.

Figure 8:
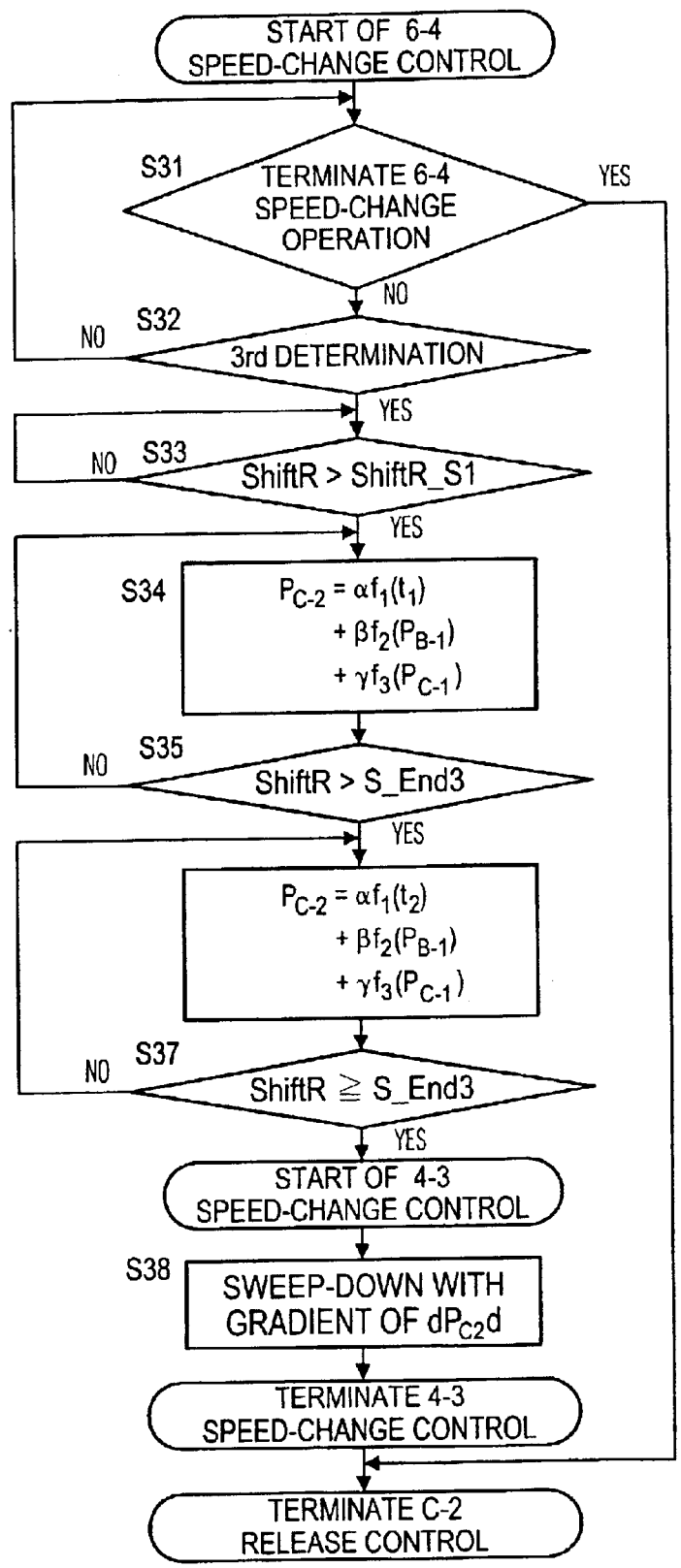
FIG. 8 is a flowchart of release control of a C-2 clutch during the 6-3 speed-change operation.

A control flowchart for releasing the C-2 clutch or the second engagement element is shown in FIG. 8.

C-2 Release Control

As a premise in this processing, the C-2 release control is inappropriate if the 6-4 speed-change operation has already been terminated. To exclude this case, it is determined first in step S31 whether or not the 6-4 speed-change operation has been terminated. If the result of the determination in step S31 is positive, subsequent processings are skipped to terminate the C-2 release control. While the aforementioned case is excluded, it is then determined in step S32 whether a shift command to the third-speed stage is fulfilled (3rd determination). Thus, a shift operation to the third-speed stage is distinguished from shift operations to the other speed-change stages. After it has thus been confirmed that performance of the present control is appropriate, a determination on a proceeding degree (ShiftR) of the speed-change operation is started in step S33 so as to determine a timing for starting to release the C-2 clutch. An indicator for making a determination on a proceeding degree of the speed-change operation in this case is a value (ShiftR_S1) that is based on a speed of the input shaft of the transmission. As soon as the result of the determination in step S33 becomes positive (ShiftR>ShiftR_S1), a low-pressure processing of reducing the servo hydraulic pressure of the C-2 clutch ($P_{C-2}=\alpha f_1(t_1)+\beta f_2(P_{B-1})+\gamma f_3(P_{C-1})$) is performed in step S34.

It is to be noted herein that $f_1(\ )$ represents a C-2 clutch pressure required for an input torque in a state of the sixth-speed stage, that $f_2(\ )$ represents a C-2 clutch pressure correction amount required for maintaining the state of the sixth-speed stage without causing the C-2 clutch to slip in response to a change in a B-1 brake pressure, that $f_3(\ )$ represents a C-2 clutch pressure correction amount corresponding to a change in a C-2 clutch quotient torque generated in response to a change in a C-1 clutch pressure, and that each of $\alpha$, $\beta$, and $\gamma$ represents a gain used in calculating a corresponding one of the hydraulic pressures. In this case, a torque $t_1$ for holding the C-1 clutch can be calculated according to an equation $t_1=t_0-g(\_inSp)$, wherein $t_0$, _inSp, and $g(\_inSp)$ represent an input torque that does not include inertia, a rotational acceleration of the input shaft, and an inertia torque for the rotational acceleration, respectively.

While the low-pressure processing is thus performed, a determination on a proceeding degree (ShiftR) of the speed-change operation is then made (ShiftR>S_End3) in step S35 so as to determine whether there is a state (i.e. predetermined proceeding degree (ShiftR)) prior to synchronization with the fourth-speed stage. As soon as the result of the determination in step S35 becomes positive, a low-pressure control operation at the subsequent stage ($P_{C-2}=\alpha f_1(t_2)+\beta f_2(P_{B-1})+\gamma f_3(P_{C-1})$) is then performed in step S36. In this case, on the basis of the same definition as described above, a torque $t_2$ for holding the C-1 clutch is calculated according to an equation $t_2=t_0-g(\omega_0)$, wherein $g(\omega_0)$ represents an inertia torque for a target rotational acceleration $\omega_0$ corresponding to the proceeding degree of the speed-change operation.

Figure 9:
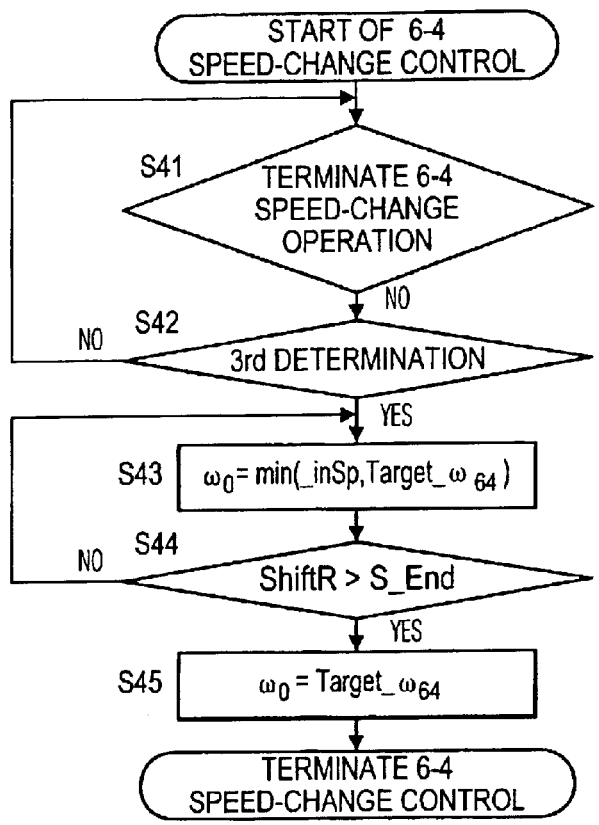
FIG. 9 is a flowchart for setting a target rotational acceleration during the 6-3 speed-change operation.

FIG. 9 is a flowchart for setting the target rotational acceleration $\omega_0$ corresponding to the proceeding degree of the speed-change operation. In this flowchart, it is determined first in step S41 whether the 6-4 speed-change operation is proceeding. On the premise that the 6-4 speed-change operation is proceeding, it is then determined in step S42 whether a 6-3 speed-change command has been issued at this stage. After it has thus been confirmed that the 6-4 speed-change operation is proceeding and that 6-3 speed-change command has been issued, the target rotational acceleration $\omega_0$ corresponding to the proceeding degree of the speed-change operation is then set in step S43 ($\omega_0$=min (_inSp, Target_$\omega_{64}$), that is, the smaller one of the input rotational acceleration (_inSp) and the target rotational acceleration (Target_$\omega$64) for the 6-4 speed-change operation is set as $\omega_0$). In this case, Target_$\omega_{64}$ represents a target rotational acceleration for the 6-4 speed-change operation. After the target rotational acceleration coo corresponding to the proceeding degree of the speed-change operation has thus been set, the proceeding degree of the speed-change operation (ShiftR>S_End) is then monitored in step S44. If the result of this determination becomes positive, the target rotational acceleration $\omega_0$ is then fixed as a constant value ($\omega$_=Target_$\omega_{64}$) in step S45. Thus, the target rotational acceleration $\omega_0$ is determined on the basis of the input rotational acceleration (_inSp) substantially in the first half of the 6-4 speed-change operation and is set as the constant value (Target_$\omega_{64}$) substantially in the second half of the 6-4 speed-change operation.

Figure 10:
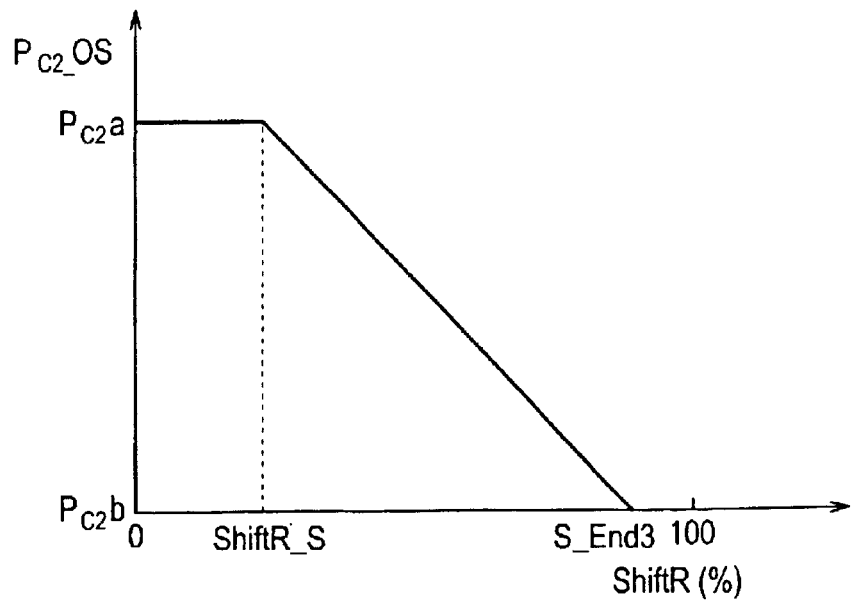
FIG. 10 is a hydraulic-pressure characteristic diagram showing a method of setting a safety factor for a hydraulic pressure for releasing the C-2 clutch.

The aforementioned input torque can be calculated by calculating an engine torque from a map defining a relation between throttle opening and engine speed, calculating a speed ratio from input and output speeds of the torque converter, and multiplying the engine torque by the speed ratio. The input torque is then converted into a hydraulic pressure by dividing the input torque by a product of a pressure-receiving area of the piston of the hydraulic servo of a corresponding one of the engagement elements, the number of frictional members, an effective radius, and a friction coefficient, and adding a piston stroke pressure to the quotient. In this case, however, the hydraulic pressure ($P_{C2\_OS}$) corresponding to the safety factor is reduced from $P_{C2}$a to $P_{C2}$b in accordance with the proceeding of the speed-change operation, as is apparent from FIG. 10. Although release (slip) of the C-2 clutch is started by setting $P_{C2}$b as 0 in this case, the proceeding degree of the speed-change operation at this moment is set at a point short of 100%.

Referring again to FIG. 8, while the aforementioned low-pressure processing is continued, a determination on a proceeding degree (ShiftR) of the speed-change operation is continued (ShiftR>S_End2) in step S37. As soon as the result of the determination in step S37 becomes positive, the fourth-speed stage is established completely. Thus, the 4-3 speed-change control is then performed (The 4-3 speed-change control is started.).

If the 4-3 speed-change control is started, a low-pressure processing (sweep-down with a gradient of $dP_{C2}$d) is performed to completely remove the servo hydraulic pressure applied to the C-2 clutch. Because this processing is also completed automatically as soon as the solenoid valve 2 reaches a full output, the 4-3 speed-change control for releasing the C-2 clutch is terminated without performing any particular monitoring or determining operation. Thus, the C-2 release control is terminated.

Figure 11:
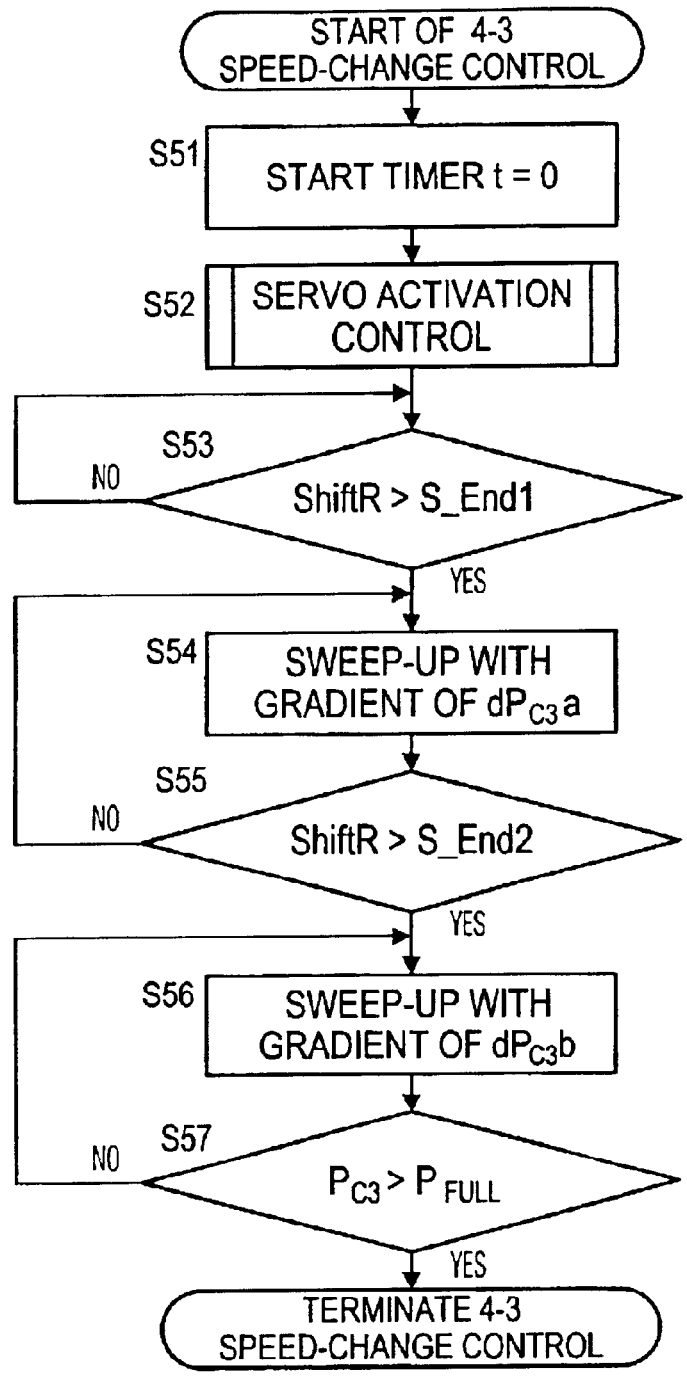
FIG. 11 is a flowchart of engagement control of a C-3 clutch during the 6-3 speed-change operation.

A control flowchart for engaging the C-3 clutch or the fourth engagement element is shown in FIG. 11.

C-3 Engagement Control

This control is substantially identical to the aforementioned engagement control of the C-1 clutch, although they are started at different timings. In this control, the timer is first started in step S51 (start timer t=0). A servo activation control sub-routine processing is then performed in step S52. This processing is designed to maintain a fast fill of a hydraulic pressure for filling a hydraulic servo cylinder for the C-3 clutch and a subsequent piston stroke pressure for narrowing a gap between a hydraulic servo piston and a frictional member of the engagement element. This processing is a known processing that is usually performed to engage a clutch. A determination on a proceeding degree as an indicator (ShiftR) for making a determination on a proceeding degree of a speed-change operation is made (ShiftR>S_End1) in step S53. The proceeding degree (ShiftR) of the speed-change operation has already been described above. Because the result of this determination is negative (No) at the outset, the processing for this determination is continued until the proceeding of the speed-change operation is completed. As soon as the result of the aforementioned determination becomes positive (Yes), a pressure-increasing operation for starting engagement of the C-3 clutch (sweep-up with a gradient of $dP_{C3}$a) is started in step S54. In step S55, while this pressure-increasing operation is continued, it is determined whether the proceeding degree (ShiftR) of the speed-change operation has reached synchronization with the third speed stage (ShiftR>S_End2). Because the result of this determination is also negative at the outset, the sweep-up operation is continued through repetition of a loop for returning to step S54 until the proceeding of the speed-change operation is completed. If the result of the determination in step S55 becomes positive, a processing of increasing the servo hydraulic pressure to a line pressure (sweep-up with a gradient of $dP_{C3}$b) is performed in step S56 so as to reliably maintain engagement of the C-3 clutch. A processing of determining whether the servo hydraulic pressure has reached the line pressure ($P_{C1}$>$P_{FULL}$) is then repeated in step S57. As soon as the result of the determination in step S57 becomes positive, the 4-3 speed-change control for engagement control of the C-3 clutch is terminated.

Figure 12:
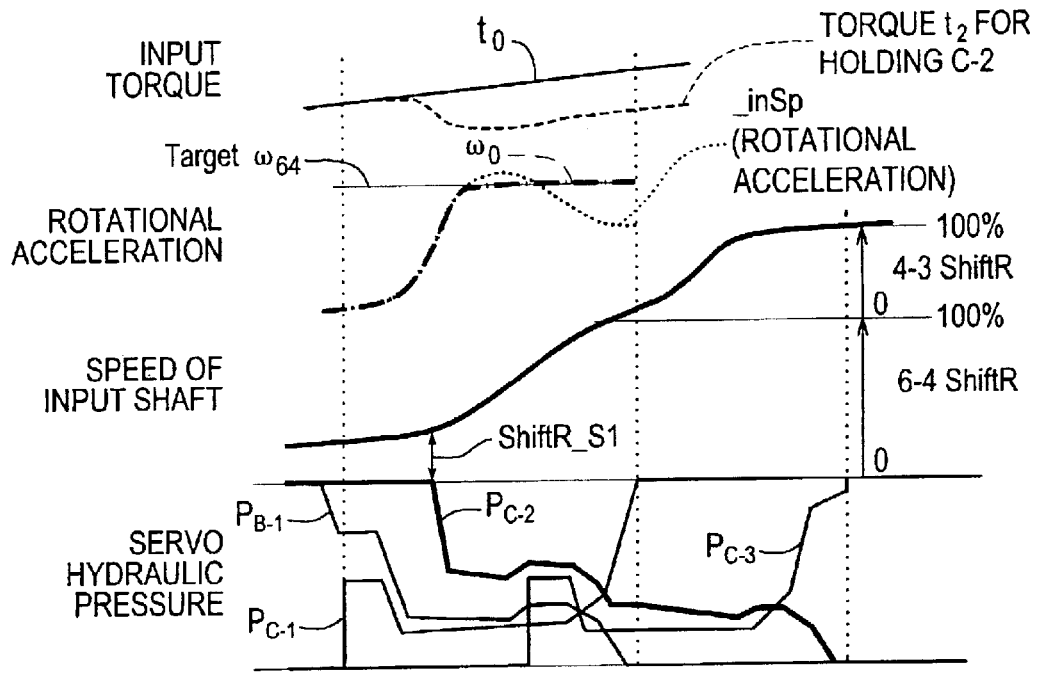
FIG. 12 is a time chart showing how a relation of control among the respective engagement elements during the 6-3 speed-change operation is related to the proceeding of the speed-change operation.

Operations of the four engagement elements resulting from the aforementioned 6-3 speed-change control are represented comprehensively as changes in servo hydraulic pressures. FIG. 12 is a time chart showing how the operations of the four engagement elements are related to the speed of the input shaft, the rotational acceleration (_inSp) of the input shaft, the target rotational acceleration ($\omega_0$), and the input torque ($t_0$). As can be seen from FIG. 12, the servo hydraulic pressure PB-1 of the B-1 brake is first set temporarily as a low pressure slightly lower than a line pressure, immediately whereafter engagement control of the C-1 clutch is started so that the servo hydraulic pressure PC-1 of the C-1 clutch is increased to a fast-fill pressure. Then, at a timing when the fast fill is completed, the servo hydraulic pressure $P_{B-1}$ of the B-1 brake is reduced to a predetermined pressure $P_{B1}$c at the beginning of the sweep-down operation, and the servo hydraulic pressure $P_{C-1}$ of the C-1 clutch is reduced to an initial pressure at the beginning of the sweep-up operation. The servo hydraulic pressure $P_{B-1}$ of the B-1 brake is reduced with a constant gradient dPBI through feedback control, and the servo hydraulic pressure $P_{C-1}$ of the C-1 clutch is increased with a constant gradient $dP_{C1}$a. Thereby, the 6-4 speed-change operation is started, and the speed of the input shaft starts to increase. At this moment, in the gear train shown in FIG. 2, the B-1 brake starts to slip, whereby the sun gears S3, S2 proceed in directions of deceleration and acceleration respectively with respect to a point of engagement of the C-2 clutch that is in engagement. Thereby, the rotational-element side of the B-1 brake starts to rotate positively from a hooked state corresponding to 0. As for the output-element side of the C-3 clutch, the output-element side is accelerated from negative rotation on the output-element side with respect to decelerated rotation on the input-element side, and proceeds toward positive rotation. On the other hand, the C-1 clutch is decelerated in the same direction as and at the same speed as rotation of the engine from a state of positive rotation that has been substantially accelerated with respect to rotation of the engine.

If the speed of the input shaft then rises so that the timing for starting release control of the C-2 clutch is attained, the servo hydraulic pressure $P_{C-2}$ of the C-2 clutch is reduced at a stretch to such a hydraulic pressure that release (slip) of the C-2 clutch is not caused. The servo hydraulic pressure of the C-2 clutch is then gradually reduced through a control operation based on the target rotational acceleration $\omega_0$ corresponding to the input rotational acceleration _inSp indicated by a broken line in FIG. 12). On one hand, the 6-4 speed-change operation proceeds toward synchronization with the fourth-speed stage. If it is determined that the operation has proceeded from the speed of the input shaft and reached a state of 70% prior to synchronization with the fourth-speed stage (S_End1), a sweep-up operation of increasing the servo hydraulic pressure $P_{C-1}$ of the C-1 clutch is started as the first stage. As a result, engagement (slip) of the C-1 clutch proceeds. If the C-1 clutch thereby reaches 90% prior to a state of completion of engagement, it is determined from the speed of the input shaft that a state prior to synchronization with the fourth-speed stage is achieved (S_End2). Therefore, the servo hydraulic pressure $P_{C-1}$ of the C-1 clutch is switched to a state of a rise toward the line pressure as the second stage. On the other hand, the servo hydraulic pressure of the C-2 clutch during descent control is controlled through the reduction control in such a manner as to become a hydraulic pressure suited to reach a state (i.e. predetermined proceeding degree) prior to the start of release when it is determined that a state prior to synchronization with the fourth-speed stage has been achieved (S_End3). Therefore, at this stage, the second-stage control operation of controlling the target rotational acceleration $\omega_0$ on the basis of the constant value (Target_$\omega_{64}$) of the target rotational acceleration during the 6-4 speed-change operation is started. Due to this control operation, the torque $t_2$ for holding the C-2 clutch is held at a constant value in a state corresponding to the start of slip. On the gear train, at this moment, the C-2 clutch starts to slip and rotates negatively. Immediately thereafter, the C-1 clutch that has been decelerated in a state of deceleration of slip from a state of deceleration of release proceeds toward null rotation of engagement. Meanwhile, the speed of the C-3 clutch continues to increase. If it is determined that the servo hydraulic pressure $P_{C-1}$ of the C-1 clutch has reached the line pressure, engagement control of the C-3 clutch is started. Thereby, after reaching a peak upon synchronization with the fourth-speed stage (4th 100%), the speed of the C-3 clutch starts to decrease. The C-3 clutch then passes through a state of slip-based deceleration and proceeds toward a state of null rotation of complete engagement. The hydraulic-pressure control that is performed in accordance with the proceeding of engagement of the C-3 clutch is identical to the control in the case of the C-1 clutch, except that a determination on the proceeding degree of 70% or a state prior to synchronization is made on the basis of the third-speed stage instead of the fourth-speed stage. If synchronization with the third-speed stage is then achieved due to the proceeding of the 4-3 speed-change operation, the servo hydraulic pressure $P_{C-2}$ of the C-2 clutch is released completely, and the servo hydraulic pressure $P_{C-3}$ of the C-3 clutch is increased to a line pressure due to a full output. Thus, the 6-3 speed-change operation is realized in a successive manner, namely, in the form of 6-4-3 speed-change operations.

Figure 13:
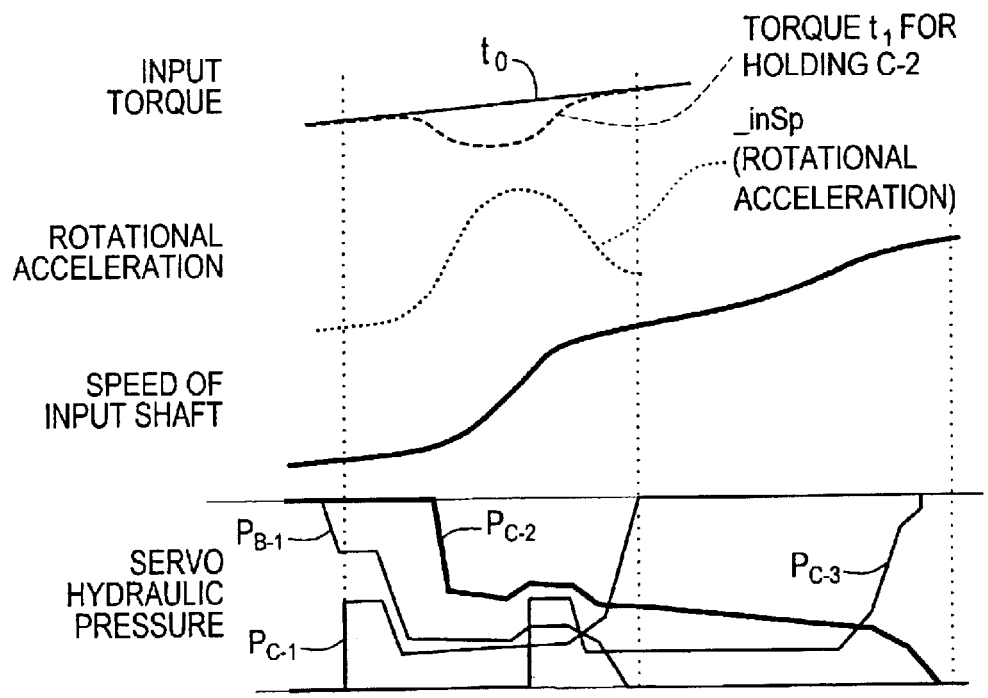
FIG. 13 is a time chart showing how a relation of control among the respective engagement elements in the case where target rotational acceleration control is not performed during the 6-3 speed-change operation is related to the proceeding of the speed-change operation.

Furthermore, FIG. 13 is a time chart showing a 6-3 speed-change operation that is performed irrespective of the setting of the target rotational acceleration (Target_$\omega_{64}$), in contrast with the aforementioned 6-3 speed-change operation. In the time chart shown in FIG. 13, during a period of transition from the 6-4 speed-change operation to the 4-3 speed-change operation, the rotational acceleration of the input shaft falls, for example, due to an increase in the pressure applied to the B-1 brake, whereby the torque $t_1$ (indicated by a broken line in FIG. 13) for holding the C-2 clutch recovers to the input torque to. As a result, the C-2 clutch that has temporarily assumed a state of slip is engaged again, and the timing for starting the 4-3 speed-change operation is delayed, or the input speed increases bluntly at the beginning of the 4-3 speed-change operation. Thus, the timing for substantially completing the 4-3 speed-change operation, namely, the timing for interchanging release of the C-2 clutch with engagement of the C-1 clutch is retarded substantially. It is apparent from changes in the speed of the input shaft shown in the time chart of FIG. 12 that this period has been shortened substantially. In this manner, the period for the 6-3 speed-change operation can be shortened by setting the target rotational acceleration (Target_$\omega_{64}$).

Although the case of the 6-3 speed-change operation has been described above, the speed-change control is performed in a similar manner as to the case of the 5-2 speed-change operation as well, except that the engagement elements to be controlled are replaced. In this case, the first engagement element, the second engagement element, and the third engagement element are the C-2 clutch, the C-3 clutch, and the C-1 clutch, respectively. However, this gear train is specially designed in that the second-speed stage is established through engagement (lock) of the F-1 one-way clutch as the fourth engagement element instead of engagement of the B-1 brake. Therefore, unlike the case of the 6-3 speed-change operation, hydraulic-pressure control for engaging the B-1 brake in the second speed-change stage (the 3-2 speed-change operation) is unnecessary. As a result, simplification of control is achieved accordingly.

Further, according to the foregoing description, the larger one of the rotational acceleration (_inpSp) of the input shaft and the target rotational acceleration (Target_$\omega_{64}$) for the 6-4 speed-change operation is selected as the target rotational acceleration $\omega_0$ in the initial period of the speed-change operation, and Target_$_{64}$ is selected if the proceeding degree of the speed-change operation exceeds S_End afterwards. However, it is also possible to set the rotational acceleration _iupSp) of the input shaft as the target rotational acceleration $\omega_0$ in the initial period of the speed-change operation and replace the rotational acceleration (_iupSp) of the input shaft with the target rotational acceleration (Target_$\omega_{64}$) for the 6-4 speed-change operation after the rotational acceleration (_inpSp) of the input shaft has become equal to or greater than the target rotational acceleration (Target_$\omega_{64}$) for the 6-4 speed-change operation.

The invention has been described in detail while referring to its embodiment regarding the specific gear train. However, the concept of the invention is not to be limited to the gear train shown as an example. The invention is applicable to all the gear trains wherein a relation of engagement and release among engagement elements in a speed-change operation to which four engagement elements are related is established by simultaneously changing over the four elements.

What is claimed is:

1. A control apparatus for an automatic transmission wherein operation of four engagement elements is required at the time of a speed-change operation from a first speed-change stage to a second speed-change stage, wherein the first speed-change stage is established through engagement of a first engagement element and a second engagement element, and wherein a second speed-change stage is established through engagement of a third engagement element and a fourth engagement element, comprising:

speed-change control means for controlling a hydraulic pressure of a hydraulic servo of the second engagement element prior to a start of release of the second engagement element in accordance with a predetermined target rotational acceleration, wherein the second engagement element is controlled by the hydraulic pressure of the hydraulic servo for the second engagement element, and the hydraulic pressure is controlled in accordance with a rotational acceleration of the input shaft and the target rotational acceleration and is determined by switching over the rotational acceleration of the input shaft and the target rotational acceleration.

2. The control apparatus according to claim 1, wherein the target rotational acceleration is set in accordance with a rotational acceleration of an input shaft at the time when the first engagement element is released.

3. The control apparatus according to claim 1, wherein the hydraulic pressure of the hydraulic servo for the second engagement element is determined on the basis of the smaller one of the rotational acceleration of the input shaft and the target rotational acceleration.

4. The control apparatus according to claim 1, wherein the hydraulic pressure of the second engagement element is determined on the basis of the target rotational acceleration if the proceeding degree of a speed-change operation resulting from release of the first engagement element exceeds a predetermined value.

5. The control apparatus according to claim 4, wherein the hydraulic pressure of the hydraulic servo for maintaining engagement of the second engagement element until it is released is set as a minimum hydraulic pressure required for maintaining the first speed-change stage, on the basis of the rotational acceleration of the input shaft or the target rotational acceleration.

6. The control apparatus according to claim 5, wherein the hydraulic pressure of the hydraulic servo for the second engagement element is set as a predetermined guard hydraulic pressure if the determined hydraulic pressure has become lower than the guard pressure.

7. The control apparatus according to claim 6, wherein the guard hydraulic pressure is a minimum hydraulic pressure allowing engagement of the second engagement element to be maintained.

8. The control apparatus according to claim 1, wherein the hydraulic pressure of the hydraulic servo for the second engagement element is determined on the basis of the rotational acceleration of the input shaft until the rotational acceleration of the input shaft exceeds the target rotational acceleration, and is determined on the basis of the target rotational acceleration after the rotational acceleration of the input shaft has exceeded the target rotational acceleration.

9. The control apparatus according to claim 8, wherein the hydraulic pressure of the hydraulic servo for maintaining engagement of the second engagement element until it is released is set as a minimum hydraulic pressure required for maintaining the first speed-change stage, on the basis of the rotational acceleration of the input shaft or the target rotational acceleration.

10. The control apparatus according to claim 9, wherein the hydraulic pressure of the hydraulic servo for the second engagement element is set as a predetermined guard hydraulic pressure if the determined hydraulic pressure has become lower than the guard pressure.

11. The control apparatus according to claim 10, wherein the guard hydraulic pressure is a minimum hydraulic pressure allowing engagement of the second engagement element to be maintained.

12. The control apparatus according to claim 1, wherein the hydraulic pressure of the hydraulic servo for the second engagement element is determined in accordance with an input torque and an inertia torque that occurs in a drive system and that is calculated on the basis of the rotational acceleration of the input shaft and the target rotational acceleration.

13. The control apparatus according to claim 1, wherein the speed-change control means performs control such that release of the second engagement element is started after release of the first engagement element has been started and that engagement of the fourth engagement element is completed after engagement of the third engagement element has been completed.

14. The control apparatus according to claim 13, wherein the speed-change control means performs control for starting to release the second engagement element before engagement of the third engagement element is completed.

15. The control apparatus according to claim 1, wherein the speed-change control means releases the first engagement element, and starts control for releasing the second engagement element during control for engaging the third engagement element.

16. The control apparatus according to claim 15, wherein the automatic transmission establishes the first speed-change stage by engaging the first engagement element and the second engagement element, establishes the second speed-change stage by engaging the third engagement element and the fourth engagement element, and establishes the-a third speed-change stage by engaging the second engagement element and the third engagement element.

17. A control apparatus for an automatic transmission wherein operation of four engagement elements is required at the time of a speed-change operation from a first speed-change stage to a second speed-change stage, wherein the first speed-change stage is established through engagement of a first engagement element and a second engagement element, and wherein a second speed-change stage is established through engagement of a third engagement element and a fourth engagement element, comprising:

speed-change control means for controlling a hydraulic pressure of a hydraulic servo of the second engagement element prior to a start of release of the second engagement element in accordance with a predetermined target rotational acceleration, wherein:
the second engagement element is controlled by the hydraulic pressure of the hydraulic servo for the second engagement element,
the speed-change control means releases the first engagement element, and starts control for releasing the second engagement element during control for engaging the third engagement element,
the automatic transmission establishes the first speed-change stage by engaging the first engagement element and the second engagement element, establishes the second speed-change stage by engaging the third engagement element and the fourth engagement element, and establishes a third speed-change stage by engaging the second engagement element and the third engagement element, and the target rotational acceleration is determined by a target period for a speed-change operation from the first speed-change stage to the third speed-change stage, a gear ratio and an output speed in the first speed-change stage, and a gear ratio and an output speed in the third speed-change stage.

18. The control apparatus according to claim 17, wherein the hydraulic pressure of the second engagement element is determined on the basis of the rotational acceleration of the input shaft substantially in the first half of the speed-change operation from the first speed-change stage to the third speed-change stage, and is determined on the basis of the target rotational acceleration substantially in the second half of the speed-change operation from the first speed-change stage to the third speed-change stage.

19. The control apparatus according to claim 1, wherein the speed-change operation from the first speed-change stage to the second speed-change stage is a kick-down speed-change operation performed by depressing an accelerator pedal.

* * * * *